H. NEUHAUS.
APPARATUS FOR THE PRODUCTION OF STEREOSCOPIC PICTURES.
APPLICATION FILED JUNE 19, 1912.
1,074,284.
Patented Sept. 30, 1913.
2 SHEETS—SHEET 1.
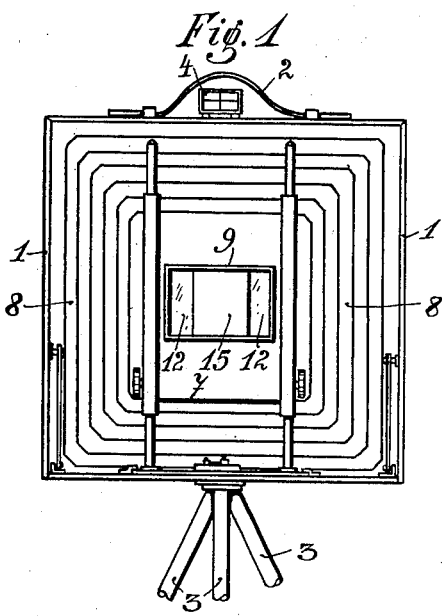
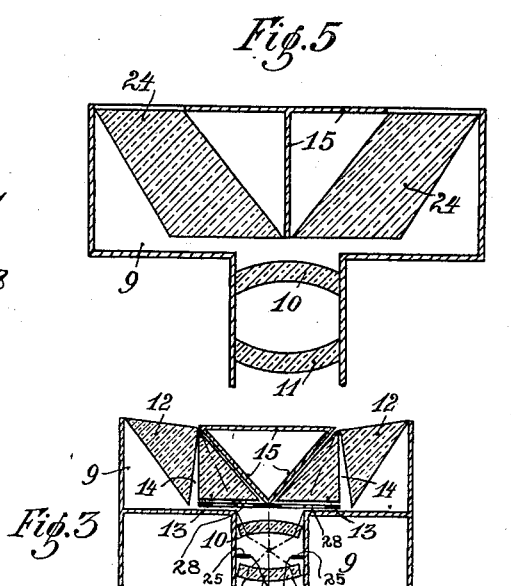
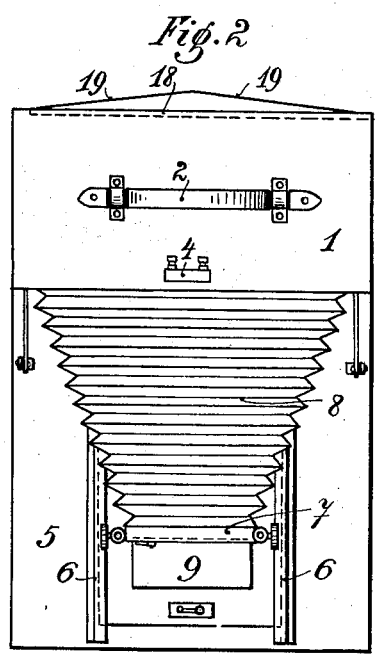
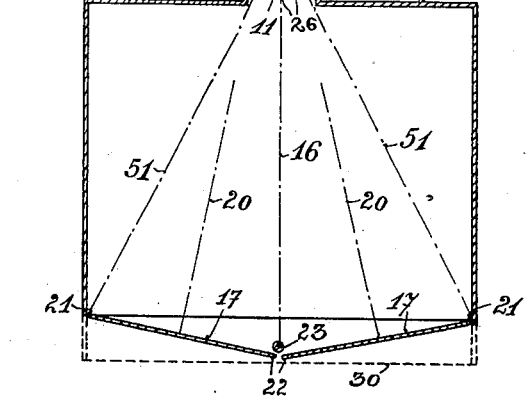
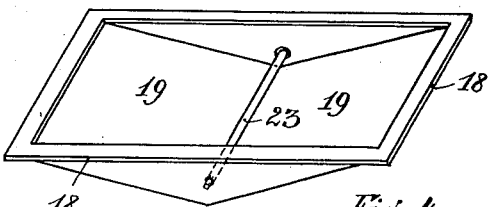

H. NEUHAUS.
APPARATUS FOR THE PRODUCTION OF STEREOSCOPIC PICTURES.
APPLICATION FILED JUNE 19, 1912.
1,074,284. Patented Sept. 30, 1913.
2 SHEETS—SHEET 2.
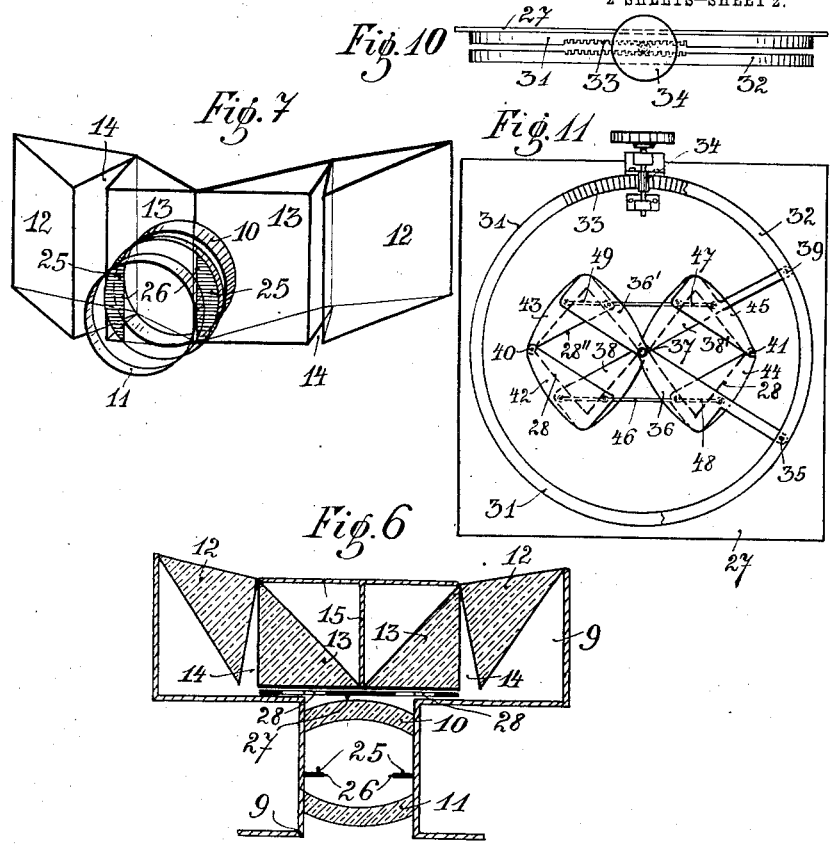
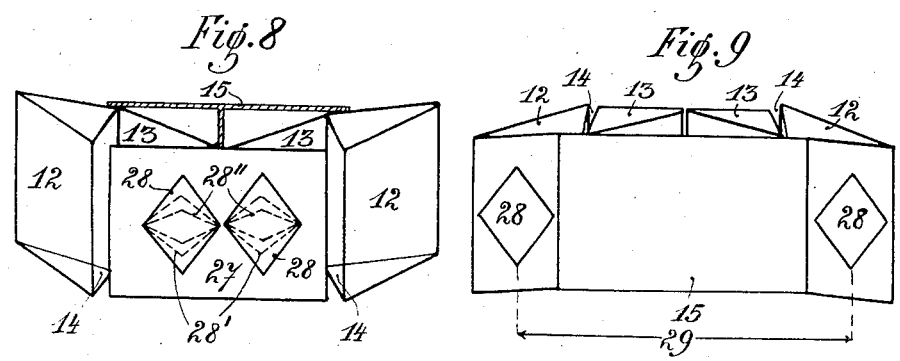

UNITED STATES PATENT OFFICE.

HERMANN NEUHAUS, OF WOLFRATSHAUSEN, NEAR MUNICH, GERMANY.

APPARATUS FOR THE PRODUCTION OF STEREOSCOPIC PICTURES.

1,074,284.　　　　　Specification of Letters Patent.　　Patented Sept. 30, 1913.

Application filed June 19, 1912. Serial No. 704,574.

*To all whom it may concern:*

Be it known that I, HERMANN NEUHAUS, a subject of the Emperor of Germany, and residing at Wolfratshausen, near Munich, Germany, have invented certain new and useful Improvements in Apparatus for the Production of Stereoscopic Pictures, of which the following is a specification.

This invention relates to apparatus for the production of stereoscopic pictures of the kind, in which only one objective is made use of in connection with a system of glass prisms which are foiled like mirrors and arranged in front of said objective. In contradistinction to the known arrangements of this kind, the prisms employed in the present invention are not foiled, but merely polished, and a sensitive plate located vertically to the axis of the objective is not used, but two such plates are used arranged roof like in an angle to each other; or a correspondingly shaped film strip is used in lieu of said plates. Furthermore the objective of this improved stereoscope is provided with an arrangement comprising two diaphragms, one of which is located within the lens-objective, and the other between this objective and the system of prisms before mentioned.

In order to make my invention more clear, I refer to the accompanying drawings, in which similar letters denote similar parts throughout the several views and in which, Figure 1 is a front view of a stereoscope constructed according to my invention. Fig. 2 is a plan view of the same. Fig. 3 is a diagrammatic representation of the objective and the sensitive plate. Fig. 4 is a perspective view of the box intended to receive the sensitive plates or the film strips. Fig. 5 is a horizontal section through a slightly modified form of construction of the prism system. Fig. 6 is a separate representation of the objective of Fig. 3, but drawn on a larger scale and with the diaphragms, Fig. 7 is a perspective view of the prisms of Fig. 6. Fig. 8 is a view similar to Fig. 7, the prisms being furnished with the front and the rear diaphragm. Fig. 9 shows the same parts from the other side. Fig. 10 is a frontal view of a device for mechanically adjusting the front diaphragm; and Fig. 11 is a front view of this device.

Referring to Figs. 1 and 2, 1 is the casing of the apparatus, 2 a handle affixed to the same; 3 is the stand, 4 the seeker, 5 a lid to which are affixed guides 6 for the objective carrier 7, which is connected in a known manner to the bellows 8, and may be moved out of and into the casing 1 by means of the same. A box 9 is secured to the objective carrier, containing the stereoscope objective, which consists of only one lens-objective with the lenses 10 and 11, (Fig. 3) in front of which is arranged the system of prisms which is composed of a pair of prisms 12 and a pair of prisms 13, the former being arranged somewhat obliquely with respect to the latter so that wedge-shaped spaces 14 are formed between each of the (inner) prisms 13 and the adjacent of the (outer) prisms 12. The opposite sides of the prisms 13 are covered with opaque plates 15 (Fig. 3) which prevent the light from passing from one of these prisms over into the other.

Instead of letting the plates 15 form a triangle as in Fig. 3, I may place one such plate between the prisms, as in Fig. 5, and in either case I prefer to cover completely the space between the outer or front edges of the prisms in question by such an opaque plate, there being then either three plates forming a triangle (Fig. 3) or two plates forming a T (Fig. 5).

The prisms before mentioned are not foiled like mirrors, for instance with a layer of silver, as has been customary, but they are very carefully polished. Owing hereto the loss of the entering rays of light is restricted to the refraction caused by the system of prisms, whereas in the stereoscopic objectives as used hitherto the loss of light is considerably greater in consequence of the foils absorbing very many rays.

In the stereoscopic apparatus employed up to now, a sensitive plate or a film 30 arranged vertically, with regard to the middle axis of the objective is made use of, as indicated by dotted lines in Fig. 3. This causes the arising of partial pictures which enlarge in the direction of the outer edge or rim, because the rays of light meet the surface containing the partial pictures under an obliquity which increases in the direction just mentioned. To overcome this I have provided in the box 18 two sensitive plates 17 arranged obliquely with respect to the axis 16 (Fig. 3). 51 are the outermost of the entering rays impinging upon the plates 17, and 20 are the middle ones. In order to make these rays 20 form angles of 90 degrees with the plates 17, these latter are so arranged as to have their outer edges 21 nearer to the objective than their inner edges 22. When in use, the plates 17 are covered with a box 18 having a roof-shaped rear wall 19, the box being attached to the casing 1. The degree of obliquity of the plates depends on the course of the rays 20, as conditioned by the optical system. As a matter of course, film strips also may be formed in the same way of two parts forming a kind of roof, for instance by leading the film over a shaft 23 (Figs. 3 and 4) provided exactly opposite to the lens 11.

In the form of construction shown in Fig. 5, there are but two prisms 24 instead of two pairs of prisms, as in Fig. 3. The prisms 24 are separated by the two opaque plates 15 which form a T, as already mentioned, and there is now no such space as 14 in Fig. 3. The general shape of each of the prisms 24 corresponds to the combined shapes of the prisms 12 and 13 of Fig. 3. The prisms in question are inclosed in a casing 9 holding also the lenses 10 and 11, which must correspond optically, exactly to the prisms, the whole being in every case properly computed. The lenses 10 and 11 may have, if desired, a casing of their own adapted to be attached to the casing of the prisms.

Concerning the diaphragms, as represented in Figs. 6, 7 and 8, I have provided first stationary diaphragm 25 having its place between the lenses 10 and 11, but being located nearer to the lens 11 (Fig. 6). The size of this diaphragm is always the same and its shape is such that it covers, at the two sides of the lenses 10 and 11, segment-shaped portions having vertical inner rims. The aperture of the diaphragm 25 depends on the breadth of the opaque plate 15 (Figs. 3, 5, 6, 8, 9) as well as on the degree of obliquity of the prisms 12, and is ascertained by computation. The object of this diaphragm is to prevent one portion of the partial picture from overlapping the other portion, so as to avoid the known drawback found in the ordinary stereoscopic pictures in which the two pictures do not cover each other. Another diaphragm, which is also stationary, but allows of an adjustment as to the size of its aperture, is situated between the lens 10 and the prisms. This diaphragm consists of a thin plate 27 having two openings 28 of rhomboidal shape, the longer axis or diagonal of which is vertical and variable, whereas the horizontal, shorter axis has a definite length. The distance between the two vertical axes is such that the openings 28 when seen from the front side of the prisms (Fig. 9) appear in a distance 29, which corresponds to the normal average distance between the eyes. The dotted lines $28^1$ and $28^{11}$ (Fig. 8) show two of the smaller adjustments of the openings 28, as effected by shortening the vertical axis of these openings. A suitable mechanism is provided to effect said adjustment, that is to say, changing the height of the free opening 28, the width of which remains always the same. The particular object of this construction of diaphragm consists in letting all the partial pictures have completely the same intensity of light, which is attained particularly by the rhomboidal shape of the openings 28. The mechanism for adjusting the diaphragm in the manner before described is shown in Figs. 10 and 11 and consists of a ground plate 27 having rhomboidal openings the size of which corresponds to the greatest area of the openings 28 (Fig. 8). The quadrangular plate 27 carries two circular plates 31 and 32, each of which has a circular rack 33, which meshes with a pinion 34 provided with a knob for rotating said circular plates simultaneously, but in opposite directions. To the lower plate 32 is attached, at 35, a double wing 36, $36^1$ having its fulcrum formed by a center pin 37 of the plates 31, 32. A similarly shaped double wing 38, $38^1$ is attached at 39 to the lower plate 33, this wing being also turnable upon the pin 37. Besides this pin, which forms an axle for the wings 36, $36^1$ there are other pins or axles 40, 41 upon the ground plate 27, of which the first holds two wings 42, 43 and the other holds two wings 44, 45. The wings 42 and 45 are connected by joint bars 46 with the double wing 36, $36^1$, and the wings 43 and 44 are connected by similar bars with the double wings 38, $38^1$. The straight edges of the double wings form the inner edges of the rhomboidal openings 28 and the straight edges of the single wings form the outer edges of the same. In the position of the parts as shown in Fig. 11, the free area of the openings is the smallest, viz. $28^{11}$. To increase the free area the pinion 34 is turned in the proper direction so as to cause the double wings to move inward which in their turn move the single wings inward by means of the joint-bars mentioned.

The pictures produced by aid of the improved stereoscope before described are stereoscopically, completely correct and natural, even if taken at a very short distance; they are not in any way misdrawn, distorted or unequally acted on by the light; and as their sides are immediately correct pictures taken for instance on films may be copied like ordinary plates without any transposition whatever.

What I claim as new and desire to secure by Letters Patent is:

A stereoscopic apparatus comprising in combination, a single objective provided with a pair of lenses, spaced prism elements adapted to direct light rays into said objective, a shutter between the lenses of said objective having a fixed opening, a shutter between said prisms and said objective having juxtaposed rhombic openings adapted to become smaller or narrower toward the top for the purpose of preventing an overlapping of the picture and for obtaining a uniform light.

In testimony whereof I affix my signature in presence of two witnesses.

HERMANN NEUHAUS.

Witnesses:
 OSCAR SCHROTT,
 EMIL GEIGER.